United States Patent

Fehler et al.

[11] 4,204,404
[45] May 27, 1980

[54] COMBUSTION CHAMBER FOR GAS TURBINE ENGINES, PARTICULARLY AN IGNITION DEVICE FOR SUCH A COMBUSTION CHAMBER

[75] Inventors: Adolf Fehler, Pfaffing; Günter Kirschey, Munich; Günter Kappler, Freising; Gerhard Kirchdorffer, Weissach-Flacht, all of Fed. Rep. of Germany

[73] Assignee: Motoren-und Turbinen-Union München GmbH, Fed. Rep. of Germany

[21] Appl. No.: 903,766

[22] Filed: May 8, 1978

[30] Foreign Application Priority Data

May 18, 1977 [DE] Fed. Rep. of Germany ....... 2722449

[51] Int. Cl.² ............................................. F02G 3/00
[52] U.S. Cl. ................................... 60/740; 60/39.82 S
[58] Field of Search ............... 60/39.82 S, 39.82 P, 60/39.82 R, 39.74 R, 39.69

[56] References Cited

U.S. PATENT DOCUMENTS

| | | | |
|---|---|---|---|
| 2,496,502 | 2/1950 | Steensma | 50/39.82 S |
| 3,264,825 | 8/1966 | Halls et al. | 60/39.82 S |

Primary Examiner—Carlton R. Croyle
Assistant Examiner—Edward Look
Attorney, Agent, or Firm—Scully, Scott, Murphy & Presser

[57] ABSTRACT

A combustion chamber for gas turbine engines, particularly aircraft turbojet engines, which is constituted of an outer casing, at least one flame tube inserted therein, and incorporating at least one ignition device for the produced, respectively, supplied fuel-air mixture. The ignition device comprises two high-capacity ignition or spark plugs which are presently arranged in series in a single axial plane in the flame tube, and further including an ignition fuel nozzle, whose fuel injection spray cone will simultaneously encompass the ignition spark zones of both high-capacity spark plugs.

5 Claims, 1 Drawing Figure

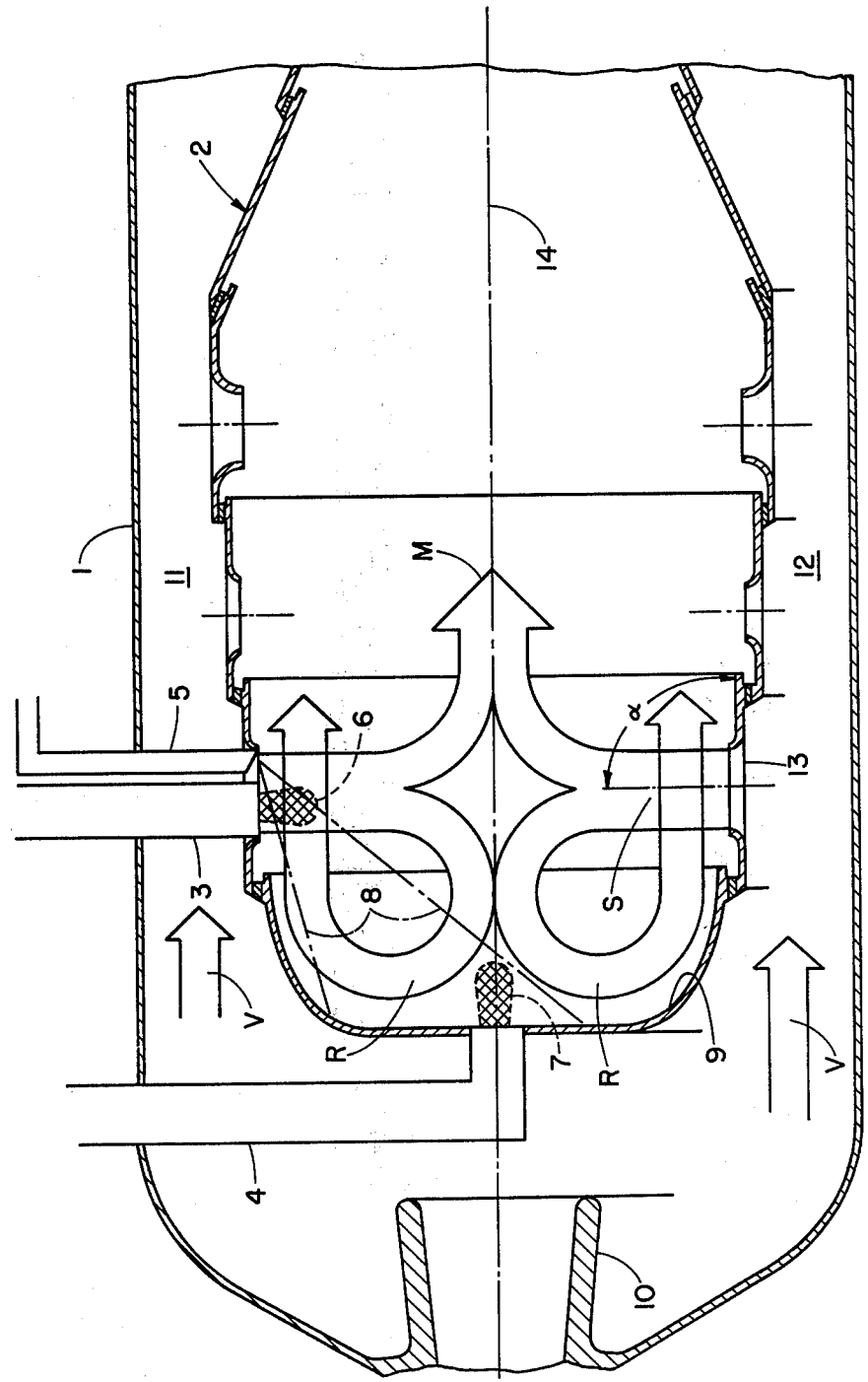

COMBUSTION CHAMBER FOR GAS TURBINE ENGINES, PARTICULARLY AN IGNITION DEVICE FOR SUCH A COMBUSTION CHAMBER

BACKGROUND OF THE INVENTION

1. Field of the Invention

The present invention relates to a combustion chamber for gas turbine engines, particularly aircraft turbojet engines, which is constituted of an outer casing, at least one flame tube inserted therein, and incorporating at least one ignition device for the produced, respectively supplied fuel-air mixture.

In general, the following operating requirements are imposed on ignition devices for the combustion chambers of gas turbine engines:

1. starting condition (cold start);
2. starting condition (hot start); as well as
3. starting condition: reignition at high flight altitude (at about 20,000 to 30,000 feet).

2. Discussion of the Prior Art

Presently known ignition devices for combustion chambers will, as a rule, satisfy the abovemenioned conditions but with substantial limitations, and particularly with regard to the difference in the aerodynamic loading of the combustion chamber, in effect, meaning relatively strongly mutually deviating flow conditions in the region of the ignition zone of the combustion chamber.

For the starting condition (cold start), as a rule starting speeds about 10% of the rated rotational speed should be adequate. This requires a good ignition and heat release performance on the part of the combustion chamber. Experience has shown that the values for the temperature increase in the combustion chamber following the ignition sequence lie at $T_3/T_2[K/K] \approx 2$ to 3. Thereby, there will be avoided over-heating as well as thermal blockage of the turbines and attendant compressor surges. As is known, for a slowly ignitable combustion chamber, the then occurring lengthy ignition delay periods will lead, on the one hand, to inadmissibly high starting temperatures and, on the other hand, to aborted start (time-dependent fuel cut-off through a safety device).

The reignition of the combustion chamber at high flight altitudes of flight sets the highest demands on the ignition capability of the combustion chamber, as well as on the ignition devices. The problems of the starting condition "cold start" are applicable here in the same sense, but aggravatingly effective are the lower air and fuel temperatures, as well as the lower air pressure and the increased air speeds in the region of the combustion chamber ignition zone. A poorer ignition performance at elevated altitudes may, upon occasion, force the aircraft to drop to a lower altitude and may, under circumstances, additionally lead to excessively high ignition temperatures (automatic cut-off, aborted start).

SUMMARY OF THE INVENTION

Accordingly, it is a primary object of this invention to provide a combustion chamber for gas turbine engines, particularly turbojet engines, which within the scope of the above-treated problem area, will optimally satisfy the mentioned requirements for the ignition characteristics with consideration being given to various operating criteria for the engine.

It is a specific object of the present invention to provide an ignition device comprising two high-capacity ignition or spark plugs which are presently arranged in series in a single axial plane in the flame tube, and further including an ignition fuel nozzle, whose fuel injection spray cone will simultaneously encompass the ignition spark zones of both high-capacity spark plugs.

Further objects and advantages of the invention will become apparent from the following detailed description and accompanying drawing.

BRIEF DESCRIPTION OF THE DRAWING

Illustrated in the single FIGURE of the drawing is an axial sectional view of an embodiment of the invention showing a schematically represented annular combustion chamber of a turbojet engine.

DETAILED DESCRIPTION

The illustrated annular combustion chamber consists of a combustion chamber outer casing 1 and a flame tube 2 which is inserted therein. First and second high-capacity spark plugs are schematically shown and are identified in series by reference numerals 3 and 4.

An ignition fuel nozzle 5, also shown schematically, is arranged directly adjacent to, as viewed in the direction of the main flow in the combustion chamber, and downstream of the first high-capacity spark plug 3.

The high-capacity spark plugs 3, 4 are otherwise arranged at right angles to each other, wherein the associated ignition spark zones are schematically identified by the reference numerals 6 and 7.

In the present exemplary embodiment, in the starting condition and with the prerequisite concurrent actuation of the high-capacity spark plugs 3, 4 and of the ignition fuel nozzle 5, the ignition fuel is injected in the form of an ignition fuel spray cone 8 against the rear wall 9 of the flame tube in such a manner so that the ignition fuel spray cone 8 concurrently encompasses the ingition spark zones 6, 7 of both high-capacity spark plugs 3, 4. The ignition fuel hereby flows past the first high-capacity spark plug 3 in close proximity to the end surface thereof.

In the interest of a simplified manner of manufacture, the first high-capacity spark plug could, for instance, be also combined with the ignition nozzle into an integral unit without any change in the inventive construction or mode of operation.

The combustion chamber is supplied with compressor air through an annularly-shaped axial-flow diffusor 10 which is arranged at the upstream end of the outer casing 1 of the combustion chamber, with the compressor air flowing into the annuli 11, 12 formed between the outer casing 1 of the combustion chamber and the flame tube 2 and from there is presently conducted to the flame tube 2 as essentially combustion mixing and cooling air.

With regard to the ignition capability of the fuel-air mixture in the combustion zone, the flow pattern of the introduced primary air produced during operation therein is of particular significane, as are the different air and, respectively, gas velocities developing in the individual zones of the combustion space.

In the embodiment pursuant to the drawing, a portion of the compressor air (arrows V) contained in the annuli 11, 12 flows into the flame tube 2 through air supply ports 13 which are staggered relative to the plane of drawing projection, respectively, the plane in which the high-capacity spark plugs 3, 4 are arranged, and namely in the form of streams S of primary air which on both sides are mutually directed against each other. As a result of the collision of the incident primary airstreams S in approximately the longitudinal center plane 14 of the chamber, the thus introduced primary air divides into an outflowing portion (arrow M) as well as into a combustion air portion which, in accordance with arrows R, first breaks up into primary zone whirls recirculating towards the back wall 9 of the flame tube, where the combustion air streams will then—while being enriched with the fuel necessary for combustion—flow downstream in the direction of the main flow in the unignited combustion chamber condition as fuel-air streams in proximity to the inner wall of the flame tube.

It becomes recognizable from this description that the two high-capacity spark plugs 3, 4 with their respective ignition zones 6, 7 lie in regions exhibiting different air velocities, the ignition spark zone 7 of the high-capacity spark plug 4 being hereby located in the longitudinal center plane 14 of the chamber in a so-called "dead-water region" between the recirculating primary zone whirls.

In the drawing, the angle $\alpha$ defines the angle of inclination of the air streams S admitted through air supply ports 13 relative to the wall of the flame tube. This angle of inclination $\alpha$ can be variable within the framework of different operating conditions elucidated further hereinbelow (for example, ground start/high altitude restart).

Although the present invention is not restricted to the type and manner by means of which the main combustion fuel is supplied to the combustion zone, it may be mentioned that the fuel supplying and preparation may be carried out by the method disclosed, for instance, known through U.S. Pat. No. 3,968,644; meaning, in the present embodiment the main fuel can be so supplied by means of fuel tubes communicating with the air supply ports 13 of the flame tube 2 that it will be carried along by the primary air portion R introduced through the ports 13 and embedded in the primary zone swirls which are subsequently developed.

The main fuel needed to support combustion, for example, could also be already admixed with the air needed for combustion prior to entering the flame tube, for instance, as is taught in connection with a combustion chamber as disclosed in German Laid-open Patent Application No. 24 52 178.

The operation of the invention is essentially as follows:

Typical combustion chamber operating conditions prevailing at ground start are characterized by small flow volumes, in effect, small combustion chamber pressure losses. Obtained thereby are inlet flow angle $\alpha$ of less than 90° for the air streams S entering the primary zone and, consequently, unlike quantities of, respectively, recirculating and exiting air. At relatively small outflow angles $\alpha$ (for instance $\alpha \simeq 70°$) the entire recirculation zone is too excessively enriched with fuel because of the lack of air which, particularly in the ignition zone 7 of the high-capacity spark plug 4, leads to unfavorable ignition conditions.

However, in this instance the high-capacity spark plug 3 is located in the region of the air-fuel mixture flowing off in a downstream direction. In the case of the combustion chamber operating at small pressure losses, there are added the effects of the low velocity in the recirculation zone due to the relatively narrow angle $\alpha$ of the downstream flow of the small pressure loss which is typical for the ground start condition, meaning, low velocities for the flow into the ports. Through superposition in the region of the ignition zone 6 of the high-capacity spark plug 3, both effects will, in this case, lead to favorable ignition conditions.

Typical combustion chamber operating conditions during reignition at high altitudes signify a substantially increased aerodynamic loading for the recirculation zone of the combustion chamber. The larger volume flow causes a higher combustion chamber pressure loss and thereby, because of the greater momentum of the incoming air streams S, a wider angle $\alpha$ for the downstream flow ($\alpha \simeq 80°$ to 90°). In the drawing the angle $\alpha$ is indicated as 90°. Formation of the streams S and higher velocity of the incoming flow lead to impermissibly high downstream flow velocities in the region of the high-capacity spark plug 3 for the ignition capability. The increased loading for this operating condition leads to relatively favorable ignition conditions in the region of the ignition zone 7 of the high-capacity spark plug 4 due to air whirls shifting towards the head of the combustion chamber, respectively, towards the rear wall 9 of the flame tube.

Set forth hereinbelow is a description of the preparation of the ignition fuel for the two operating conditions (ground start/high altitude start). For the ground start condition, the ignition fuel essentially enters the portions of the air-fuel whirls moving downstream and, thereby, into the ignition zone 6 of the high-capacity spark plug 3 because of the relatively low energy of the recirculating air whirls. The higher velocity of the air at reignition at high altitudes causes more fuel to be carried along by the air streams R flowing into the recirculation zone. This leads to an ignitable mixture in the region of the ignition zone 7 of the high-capacity spark plug 4.

The inventive concept is also applicable to encompass types of combustion chambers other than the illustrated annular combustion chamber, for instance, to purely tube or conduit type of combustion chambers, or combined tubular-annular combustion chambers.

What is claimed is:

1. In a combustion chamber for gas turbine engines, particularly for aircraft turbojet engines, comprising an outer casing; at least one flame tube inserted in said casing; and at least one ignition means for the produced, respectively, introduced fuel-air mixture; the improvement comprising: said ignition means including first and second high-capacity ignition plugs arranged in series in an essentially axial plane within said flame tube, said high-capacity ignitor plugs and their ignition spark zones being arranged at right angles to each other within the portion of the flame tube containing the combustion zone, and an ignition fuel nozzle forming a fuel injection spray cone which will simultaneously encompass the ingition spark zones of both said high-capacity ignition plugs.

2. In a combustion chamber for gas turbine engines, particularly for aircraft turbojet engines, comprising an outer casing; at least one flame tube inserted in said casing; and at least one ignition means for the produced, respectively, introduced fuel-air mixture; the improvement comprising: said ignition means including first and second high-capacity ignition plugs arranged in series in an essentially axial plane within said flame tube, and an ignition fuel nozzle forming a fuel injection spray cone which will simultaneously encompass the ignition spark zones of both said high-capacity ignition plugs, said ignition fuel nozzle being arranged directly behind a high-capacity ignition plug along the direction of the main flow in the combustion chamber.

3. Combustion chamber according to either of claims 1 or 2, said two high-capacity ignition plugs and said ignition fuel nozzle being arranged in zones of said flame tube aerodynamically differently influenced.

4. Combustion chamber as claimed in either of claims 1 or 2, said flame tube having lateral flame tube walls connected to a rear wall of said flame tube and including oppositely arranged combustion air and mixing air supply ports so as to form primary zone swirls recirculated against the flame tube rear wall responsive to the mutually converging air flows within the flame tube; the improvement comprising in that said first high-capacity ignition plug and said ignition nozzle are arranged directly at or in proximity to an air supply port in the side of said flame tube, said second high-capacity ignition plug being arranged in the rear wall of said flame tube and having the ignition zone thereof in a "dead-water region" formed by the recirculation flow.

5. Combustion chamber as claimed in either of claims 1 or 2, the fuel required for supporting the combustion process being admixed with the combustion air portion admitted through the air supply ports of said flame tube concurrent with or prior to entry into said flame tube.

* * * * *